US008341956B2

(12) United States Patent
Makino

(10) Patent No.: US 8,341,956 B2
(45) Date of Patent: Jan. 1, 2013

(54) HYDRAULIC FLUID SUPPLY DEVICE AND ELECTRIC ACTUATOR

(75) Inventor: Naohiro Makino, Gifu (JP)

(73) Assignee: Nabtesco Corporation, Tokyo (JP)

( * ) Notice: Subject to any disclaimer, the term of this patent is extended or adjusted under 35 U.S.C. 154(b) by 756 days.

(21) Appl. No.: 12/431,611

(22) Filed: Apr. 28, 2009

(65) Prior Publication Data

US 2009/0266934 A1 Oct. 29, 2009

(30) Foreign Application Priority Data

Apr. 28, 2008 (JP) ................................ 2008-116716

(51) Int. Cl.
*F16D 31/02* (2006.01)

(52) U.S. Cl. ................. 60/452; 60/394; 60/443; 60/476

(58) Field of Classification Search .................... 60/394, 60/443, 446, 452, 473, 476
See application file for complete search history.

(56) References Cited

U.S. PATENT DOCUMENTS

| | | | | |
|---|---|---|---|---|
| 7,987,668 B2 * | 8/2011 | Kakino et al. | .................. | 60/452 |
| 2008/0236156 A1 | 10/2008 | Kakino et al. | | |

FOREIGN PATENT DOCUMENTS

| | | | |
|---|---|---|---|
| DE | 10128584 | A1 | 12/2002 |
| JP | 2001-132651 | A | 5/2001 |
| JP | 2001-295802 | A | 10/2001 |
| JP | 2002-54604 | | 2/2002 |
| JP | 2003-172302 | A | 6/2003 |
| JP | 2005-036870 | A | 2/2005 |
| JP | 2005-240974 | A | 9/2005 |
| JP | 2005-308047 | A | 11/2005 |
| JP | 2006-300187 | A | 11/2006 |
| WO | 2005/024246 | A1 | 3/2005 |
| WO | 2007/114339 | A1 | 10/2007 |

OTHER PUBLICATIONS

Extended European Search Report issued in corresponding European Application No. 09158959.8 dated Jul. 17, 2012 (7 pages).
Patent Abstracts of Japan, Publication No. 2005-240974, Published on Sep. 8, 2005, 1 page.
Patent Abstracts of Japan, Publication No. 2005-036870, Published on Feb. 10, 2005, 1 page.
Patent Abstracts of Japan, Publication No. 2006-300187, Published on Nov. 2, 2006, 1 page.
Patent Abstracts of Japan, Publication No. 2001-295802, Published on Oct. 26, 2001, 1 page.

(Continued)

*Primary Examiner* — Michael Leslie
(74) *Attorney, Agent, or Firm* — Osha Liang LLP

(57) ABSTRACT

An electric actuator of the present invention includes a hydraulic fluid supply device and an actuator actuated in response to an input of hydraulic fluid from a variable-volume pump. The hydraulic fluid supply device includes an adjustable-speed motor, the variable-volume pump which is driven by the adjustable-speed motor and ejects hydraulic fluid, an electric motor control unit which controls the adjustable-speed motor so as to achieve an intended rotation speed, and a pump control unit which controls the variable-volume pump so that the ejection volume of the variable-volume pump decreases with an increase in the ejection pressure of the variable-volume pump.

9 Claims, 10 Drawing Sheets

OTHER PUBLICATIONS

English abstract of German Publication No. 101 28 584 published on Dec. 19, 2002, Espacenet database, 1 page.

Office Action issued in corresponding Japanese Application No. 2008-116716 dated Aug. 7, 2012 (11 pages).

English abstract of Japanese Publication No. 2005-308047 published on Nov. 4, 2005, Espacenet database, 1 page.

English abstract of Japanese Publication No. 2003-172302 published on Jun. 20, 2003, Espacenet database, 1 page.

English abstract of Japanese Publication No. 2001-132651 published on May 18, 2001, Espacenet database, 1 page.

* cited by examiner

HYDRAULIC FLUID SUPPLY DEVICE AND ELECTRIC ACTUATOR

CROSS REFERENCE TO RELATED APPLICATION

The present application claims priority from Japanese Patent Application No. 2008-116716, which was filed on Apr. 28, 2008, the disclosure of which is herein incorporated by reference in its entirety.

BACKGROUND OF THE INVENTION

1. Technical Field

The present invention relates to a hydraulic fluid supply device capable of supplying hydraulic fluid, and an electric actuator adopting such a hydraulic fluid supply device.

2. Background Art

There have been known an electric actuator such as one described in Japanese Unexamined Patent Publication No. 54604/2002 (Tokukai 2002-54604; hereinafter, Patent Citation 1), which adopts a hydraulic fluid supply device capable of supplying hydraulic fluid. This electric actuator has an electric motor, a pump which outputs oil according to the rotation of the electric motor, a cylinder into which the oil output from the pump is input, a controller which controls the rotation of the electric motor according to the motion of the cylinder, and a backup valve which circulates the oil output from the pump in the cylinder. When the pressure of oil input to the cylinder equals or surpasses a predetermined pressure, the backup valve stops circulation of the oil output from the pump. Since the backup valve provides a support for a force applied to the cylinder in the above structure, there is no need for supplying oil from the pump to the cylinder.

However, in the electric actuator of Patent Citation 1, the electric motor needs to be driven to output a high torque when supplying high pressure oil from the pump. In other words, a high current needs to be supplied to the electric motor which drives the pump. This increases the amount of heat generated by the electric motor, the controller of the electric motor, or the like. This generated heat, if causing an increase in the temperature of the electric motor or the like, may yield an adverse effect such as a problem in driving and controlling the electric actuator, thus deteriorating the reliability of the electric actuator. Further, the need of supplying a high current in the electric motor raises concern about an increase in the power consumption of the electric actuator. A conceivable approach to solve this problem is to ensure a sufficient heat dissipation area by increasing the surficial area of the electric actuator. This approach however causes a problem of an increase in the volume and weight of the electric actuator.

The present invention is made in view of the above circumstances, and it is an object of the present invention to provide a hydraulic fluid supply device capable of supplying a high pressure hydraulic fluid with a low current, and an electric actuator capable of outputting a high performance with a low current.

SUMMARY OF THE INVENTION

The present invention relates to a hydraulic fluid supply device capable of supplying hydraulic fluid, and an electric actuator adopting such a hydraulic fluid supply device. To achieve the above object, a hydraulic fluid supply device and an electric actuator of the present invention has the following characteristics.

A first characteristic of a hydraulic fluid supply device of the present invention to achieve the above object is to include: an adjustable-speed motor; a variable-volume pump which is driven by the adjustable-speed motor and ejects hydraulic fluid; an electric motor control unit which controls the adjustable-speed motor so as to achieve a set rotation speed; and a pump control unit which controls the variable-volume pump so that an ejection volume of the variable-volume pump decreases with an increase in an ejection pressure of the variable-volume pump.

This structure enables increasing of the ejection pressure of the variable-volume pump, without a need of supplying an excessive current to the adjustable-speed motor. The structure further enables increasing of the flow amount of hydraulic fluid ejected from the variable-volume pump, without a need of excessively accelerating the rotation speed of the adjustable-speed motor.

As a second characteristic, the hydraulic fluid supply device of the present invention having the first characteristic is adapted so that the pump control unit controls the variable-volume pump so that the ejection volume of the variable-volume pump decreases proportionally to an increase in the ejection pressure of the variable-volume pump.

The structure achieves a simple relation between the ejection pressure and the ejection volume, and therefore control of the variable-volume pump is made simple.

As a third characteristic, the hydraulic fluid supply device of the present invention having the first and second characteristics is adapted so that the pump control unit includes an operation member which is moved by a pressure of hydraulic fluid ejected from the variable-volume pump, and which increases/decreases the ejection volume of the variable-volume pump; and an elastic member which biases the operation member in a direction against the pressure of hydraulic fluid acting on the operation member.

With the structure, there is provided a simply structured pump control unit capable of controlling the variable-volume pump so that the ejection volume of the variable-volume pump decreases with an increase in the ejection pressure of the variable-volume pump.

As a fourth characteristic, a hydraulic fluid supply device of the present invention includes: an adjustable-speed motor; a variable-volume pump which is driven by the adjustable-speed motor and ejects hydraulic fluid; an electric motor control unit which controls the adjustable-speed motor so as to achieve an intended rotation speed; and a pump control unit which controls the variable-volume pump so that the ejection volume of the variable-volume pump equals a first ejection volume while the ejection pressure of the variable-volume pump is lower than a predetermined pressure, and that the ejection volume of the variable-volume pump equals a second ejection volume when the ejection pressure of the variable-volume pump reaches the predetermined pressure, the second ejection volume being smaller than the first ejection volume.

Controlling the variable-volume pump so as to achieve the second ejection volume, as is done in the structure, enables increasing of the ejection pressure of the variable-volume pump, without a need of supplying an excessive current to the adjustable-speed motor. Further, controlling the variable-volume pump so as to achieve the first ejection volume enables increasing of the flow amount of hydraulic fluid ejected from the variable-volume pump, without a need of excessively accelerating the rotation speed of the adjustable-speed motor.

As a fifth characteristic, the hydraulic fluid supply device of the present invention having the fourth characteristic is adapted so that the pump control unit includes: an operation member which is moved by a pressure of hydraulic fluid ejected from the variable-volume pump, and which increases/decreases the ejection volume of the variable-volume pump; an elastic member which biases the operation member in a direction against the pressure of hydraulic fluid acting on the operation member; and a switch valve provided between the variable-volume pump and the operation member, which valve is switched to a first switch position so as to block a connection to a passage communicating the variable-volume pump with the operation member, or a second switch position so as to communicate the variable-volume pump with the operation member, the switch valve being held in the first switch position when the ejection pressure of the variable-volume pump is lower than the predetermined pressure and switched to the second switch position when the ejection pressure of the variable-volume pump reaches the predetermined pressure.

With the structure, there is provided a simply structured pump control unit capable of controlling the variable-volume pump so that the ejection volume of the variable-volume pump equals the first ejection volume while the ejection pressure of the variable-volume pump is lower than a predetermined pressure, and that the ejection volume of the variable-volume pump equals the second ejection volume when the ejection pressure of the variable-volume pump reaches the predetermined pressure.

As a sixth characteristic, a hydraulic fluid supply device of the present invention includes: adjustable-speed motor; a variable-volume pump which is driven by the adjustable-speed motor and ejects hydraulic fluid; an electric motor control unit which controls the adjustable-speed motor so as to achieve an intended rotation speed; and a pump control unit which controls the variable-volume pump so that the ejection volume of the variable-volume pump equals a first ejection volume until a predetermined period elapses from a point when the rotation speed of the adjustable-speed motor is stabilized, and that the ejection volume of the variable-volume pump equals a second ejection volume upon elapse of the predetermined period from the point when the rotation speed of the adjustable-speed motor is stabilized.

After elapse of the predetermined period from a point when the rotation speed of the adjustable-speed motor is stabilized, the structure is able to increase the ejection pressure of the variable-volume pump, without a need of supplying an excessive current to the adjustable-speed motor. Further, until the predetermined period elapses from that point when the rotation speed of the adjustable-speed motor is stabilized, the structure enables increasing of the flow amount of hydraulic fluid ejected from the variable-volume pump, without a need of excessively accelerating the rotation speed of the adjustable-speed motor.

As a seventh characteristic, the hydraulic fluid supply device of the present invention having the sixth characteristic is adapted so that the pump control unit includes: an operation member which is moved by a pressure of hydraulic fluid ejected from the variable-volume pump, and which increases/decreases the ejection volume of the variable-volume pump; an elastic member which biases the operation member in a direction against the pressure of hydraulic fluid acting on the operation member; a switch valve provided between the variable-volume pump and the operation member, which valve is switched to a first switch position so as to block a connection to a passage communicating the variable-volume pump with the operation member, or a second switch position so as to communicate the variable-volume pump with the operation member, the switch valve being held in the first switch position until the predetermined period elapses from the point when the rotation speed of the adjustable-speed motor is stabilized and switched to the second switch position upon elapse of the predetermined period from the point when the rotation speed of the adjustable-speed motor is stabilized.

With this structure, there is provided a simply structured pump control unit which controls the variable-volume pump so that the ejection volume of the variable-volume pump equals the first ejection volume until the predetermined period elapses from a point when the rotation speed of the adjustable-speed motor is stabilized, and that the ejection volume of the variable-volume pump equals a second ejection volume upon elapse of the predetermined period from the point when the rotation speed of the adjustable-speed motor is stabilized.

As an eighth characteristic, the hydraulic fluid supply device of the present invention having the third, fifth, or seventh characteristic is adapted so that the pump control unit includes a pressure adjustment unit provided between the variable-volume pump and the operation member, which adjusts the pressure of hydraulic fluid from the variable-volume pump acting on the operation member.

The structure allows adjustment of the pressure acting on the operation member. Thus, a higher level of freedom is provided in designing of the operation member and elastic member in the pump control unit for controlling the ejection volume of the variable-volume pump.

A first characteristic of an electric actuator of the present invention is to include: a hydraulic fluid supply device having any one of or a combination of the above mentioned first to eighth characteristics; and an actuator actuated in response to input of hydraulic fluid from a variable-volume pump.

In the structure, the hydraulic fluid supply device is able to supply a high pressure hydraulic fluid to the actuator with a low current. Therefore, a large force is output with a low current. Further, the structure enables increasing of the flow amount of hydraulic fluid ejected from the variable-volume pump, without a need of supplying an excessive current to the adjustable-speed motor. Thus, a large amount of hydraulic fluid can be supplied to the actuator to drive the same, with a low current.

A second characteristic of the electric actuator of the present invention having the above first characteristic is that the actuator is for driving a rudder face of a wing of an airplane.

A rudder face provided to a wing of an airplane is highly stressed due to air resistance, during a flight of the airplane (Such a situation where the rudder face is subject to a stress and the actuator is keeping the position against that stress is hereinafter referred to as stalled condition). In view of that, the actuator driving the rudder face needs to output a large force against the stress attributed to the air resistance, in the stalled condition. On the other hand, the position of the rudder face is preferably adjusted at a higher actuation speed, during the standby condition before take off or the like in which the rudder face is subject to a low stress. In this regard, the above structure by which a high pressure hydraulic fluid can be supplied to the actuator with a low current is able to reduce power consumption in the stalled condition, and prevent heat generation in the adjustable-speed motor. Further, the actuation speed can be accelerated when the rudder face is subject to a low stress.

REFERENCE NUMERALS

1 EHA (Electric Actuator)
10 Hydraulic Pressure Supply Device (Hydraulic Fluid Supply Device)
11 Servo Motor (Adjustable-Speed Motor)
12 variable-volume pump
13 Motor Control Device (Electric Motor Control Unit)
14 Pump Control Device (Pump Control Unit)
17 Tilt Angle Adjusting Cylinder
71 Cylinder Body
72 Piston (Operation Member)
73 Rod (Operation Member)
74 Spring (Elastic Member)
100 airplane
110 Rudder Face
220 Spool Valve (Pressure Adjustment Unit)

DESCRIPTION OF THE PREFERRED EMBODIMENTS

Embodiment 1

The following describes embodiments of the present invention, with reference to the attached drawings.

Figure 1:
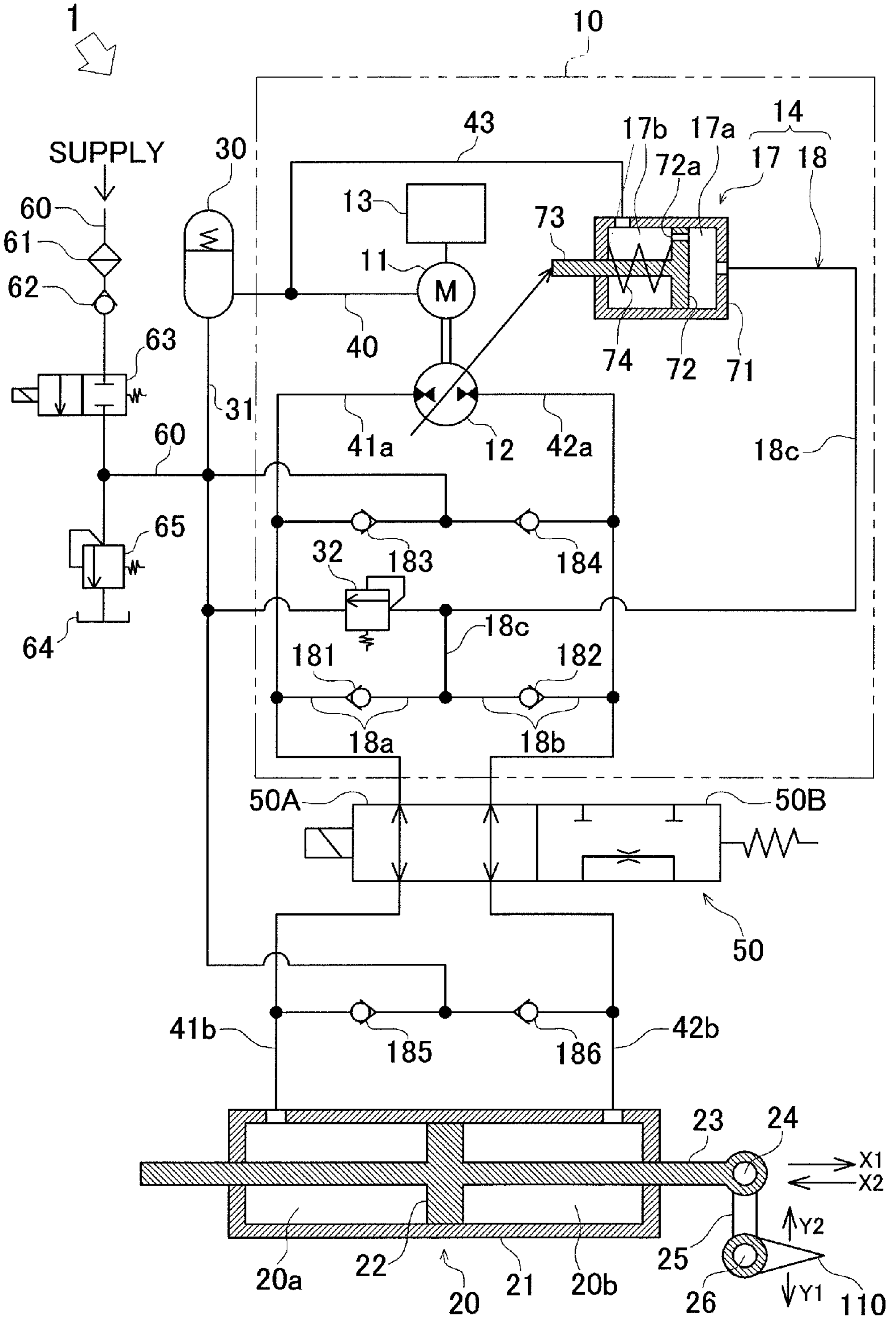
FIG. 1 illustrates a hydraulic circuit of an electric actuator of Embodiment 1, according to the present invention.

FIG. 1 illustrates a hydraulic circuit of an electric actuator of Embodiment 1, according to the present invention. In FIG. 1, an EHA (Electric Hydrostatic Actuator) 1 serving as an electric actuator includes: a hydraulic pressure supply device 10 (hydraulic fluid supply device) of the present embodiment according to the present invention; a hydraulic cylinder 20 serving as a hydraulic actuator, which is driven by the pressure of oil supplied from the hydraulic pressure supply device 10.

The hydraulic pressure supply device 10 includes: a servo motor 11 (adjustable-speed motor); a variable-volume pump 12 capable of outputting oil (hydraulic fluid) to two channels (oil passages 41*a* and 42*a*) according to the rotation of the servo motor 11; a motor control device 13 (electric motor control unit) which controls the servo motor 11 so as to achieve a set rotation speed; and a pump control device 14 (pump control unit) which controls an ejection volume of the variable-volume pump 12.

For example, the variable-volume pump 12 may be a swash plate axial piston pump, in which case the drive shaft of the servo motor 11 is connected to a cylinder block of the variable-volume pump 12.

Further, drain oil discharged from the variable-volume pump 12 passes a drive mechanism of the servo motor 11 and discharged into an oil passage 40 connected to the accumulator 30. Thus, discharging of the drain oil of the variable-volume pump 12 as well as cooling and lubrication of the servo motor 11 are possible.

The hydraulic cylinder 20 is a cylinder to which oil output by the variable-volume pump 12 is input. The hydraulic cylinder 20 includes a cylinder body 21, a piston 22 disposed inside the cylinder body 21, and a rod 23 integrally engaged with the piston 22. The cylinder body 21 and the piston 22 form an oil receiving chamber 20*a* to which oil is supplied through the oil passage 41*b*, and an oil receiving chamber 20*b* to which oil is supplied through the oil passage 42*b*.

Between the variable-volume pump 12 and the hydraulic cylinder 20 is provided a switch valve 50. For example, structuring the switch valve 50 with an electromagnetic valve, a pilot-pressure-activated mode valve, or the like, enables switching of the switch valve 50 between a first switch position 50A and a second switch position 50B. The first switch position 50A is a position of the switch valve 50 whereby the oil passages 41*a* and 41*b* are connected to each other, and the oil passage 42*a* and the oil passage 42*b* are connected to each other. The second switch position 50B is a position of the switch valve 50 whereby connection between the oil passages 41*a* and 42*a* and connection between the oil passages 42*a* and 42*b* are blocked, and the oil passages 41*b* and 42*b* are connected through a throttle passage. For example, in cases of adopting an electromagnetic valve, the switch valve 50 is powered by an external control device (not shown). The switch valve 50, when powered, is switched to the first switch position 50A and remains in the same position while the power is supplied. Upon shutting down the power, the switch valve 50 switches to the second switch position 50B, and remains in the same position until the power is supplied.

The servo motor 11, provided with a sensor (not shown) which specifies rotation position of the servo motor 11, is capable of calculating the rotation speed. Examples of such a sensor are: a resolve, a hole effect element, a pulse generator, or the like.

The motor control device 13 is further provided with a speed instruction generating unit (not shown) which sets the rotation speed of the servo motor 11. Then, to achieve an intended rotation speed of servo motor 11, the motor control device 13 performs feedback control in which the motor control device 13 supplies a predetermined current to the servo motor 11 on the basis of a speed instruction signal and speed information obtained from a position signal of the sensor in the servo motor 11.

Further, the motor control device 13 is provided with a unit for detecting the position of the rod 23. For example, such a unit is realized by arranging a linear differential transformer to the hydraulic cylinder 20 and the rod 23, and providing an exciter or a rectifier of the linear differential transformer to the motor control device 13. Based on information of the position of the rod 23, the motor control device 13 generates a speed instruction for the servo motor 11, and supplies to the servo motor 11 a current according to the speed instruction and a feedbacked speed, thereby controlling the rotation of the servo motor 11 according to the hydraulic cylinder 20.

The pump control device 14 includes: a tilt angle adjusting cylinder 17; an oil passage 18 through which the oil passages 41*a* and 42*a* are in communication with the tilt angle adjusting cylinder 17; and check valves 181 and 182 provided to the oil passage 18. The oil passage 18 includes: an oil passage 18*a* branching off from the oil passage 41*a*, an oil passage 18*b* branching off from the oil passage 42*a*, and an oil passage 18*c* to which the oil passages 18*a* and 18*b* are connected, and which communicates the oil passages 18*a* and 18*b* with the tilt angle adjusting cylinder 17.

The check valve 181 is provided to the oil passage 18*a*, and allows oil to flow from the oil passage 41*a* to the tilt angle adjusting cylinder 17, while blocking the flow of oil from the tilt angle adjusting cylinder 17 to the oil passage 41*a*. Further, the check valve 182 is provided to the oil passage 18*b*, and allows oil to flow from the oil passage 42*a* to the tilt angle adjusting cylinder 17, while blocking the flow of oil from the tilt angle adjusting cylinder 17 to the oil passage 42*a*.

The tilt angle adjusting cylinder 17 includes: a cylinder body 71, a piston 72 (operation member) arranged inside the cylinder body 71, a rod 73 (operation member) integrally engaged with the piston 73, and a spring 74 (elastic member) biasing the piston 72. Then, the cylinder body 71 and the piston 72 form a first oil receiving chamber 17*a* to which oil is supplied through the oil passage 18*c*, and a second oil receiving chamber 17*b* capable of discharging oil to the oil passage 43. The piston 72 has a throttle 72*a* communicating the first and second oil receiving chambers 17*a* and 17*b*.

The rod 73 is capable of advancing towards and withdrawing from the cylinder body 71, with reciprocation of the piston 72 inside the cylinder body 71. The rod 73 is connected to a swash plate of the variable-volume pump 12. When the rod 73 moves in a direction of projecting from the cylinder body 71 (the direction is hereinafter, referred to as advancing direction), the tilt angle of the swash plate is reduced. On the contrary, when the rod 73 moves in a direction of withdrawing into the cylinder body 71 (the direction is hereinafter referred to as withdrawing direction), the tilt angle of the swash plate is increased. That is, a movement of the rod 73 in the advancing direction reduces a volume (capacity) of oil ejected when the variable-volume pump 12 is rotated once by the servo motor 11. Such a volume of oil ejected is hereinafter simply referred to as ejection volume. A movement of the rod 73 in the withdrawing direction increases the ejection volume.

The spring 74 is disposed on the second oil receiving chamber 17*b*, and biases the piston 72 in a direction (withdrawing direction) so that the first oil receiving chamber 17*a* is narrowed. When no hydraulic pressure is generated in the first oil receiving chamber 17*a*, the piston 72 is biased in the withdrawing direction by the spring 74, and abuts an inside wall of the cylinder body 71 so that any movement in the withdrawing direction beyond that inside wall is restricted. Further, for example, when the piston 72 moves a predetermined distance in the advancing direction, the piston 72 abuts a projection formed on an inner peripheral wall of the cylinder body 71 so that a movement of the piston 72 in the advancing direction beyond the projection is restricted.

Further, the EHA 1 has an accumulator 30 which supplies oil through an oil passage 31, when an amount of oil flowing in the oil passage 41*a*, the oil passage 42*a*, the oil passage 41*b*, and the oil passage 42*b* is not sufficient. This accumulator 30 and the servo motor 11 are in communication with each other through the oil passage 40. Further, from this oil passage 40 is branched off an oil passage 43 which leads to the second oil receiving chamber 17*b* of the tilt angle adjusting cylinder 17.

Further, the EHA 1 has a check valve 183, a check valve 184, a check valve 185, and a check valve 186 which prevent adverse flows of oil from the oil passages 41*a*, the oil passage 42*a*, the oil passage 41*b*, and the oil passage 42*b* to the accumulator 30, respectively. Further, the EHA 1 has a relief valve 32 to keep the pressure of oil flowing in the oil passages 41*a* and 42*a* below a set pressure.

Further, when the amount of oil accumulated in the accumulator 30 is small, oil is supplied from an oil supply source through the oil delivering passage 60. Specifically, the oil delivering passage 60 is connected to the oil passage 31 in communication with the accumulator 30. The oil delivering passage 60 is provided with a filter 61, a check valve 62, and an electromagnetic valve 63. Powering the electromagnetic valve 63 communicates the oil supply source with the oil passage 31 which is in communication with the accumulator 30. A flow of oil from the accumulator 30 to the oil supply source is blocked by the check valve 62. Further, the oil delivering passage 60 has a relief valve 65 which discharges oil into a tank 64, when the pressure of oil flowing in the oil delivering passage 60 equals or surpasses the set pressure.

Further, the rod 23 of the EHA 1 is connected to an arm 25 through a fulcrum (rotation axis) 24. The arm 25 is connected, through a fulcrum (rotation axis) 26, to a rudder face (e.g. a flight control rudder face such as aileron, flaperon, spoiler, elevator, rudder, or the like) 110 of an airplane 100. The rudder face 110 is structured so as to be swung by the EHA 1. Note that, in addition to the EHA 1, the rudder face 110 is connected to a separate actuator or the like which is used for operating the rudder face 110 when the EHA 1 fails for example.

Figure 2:
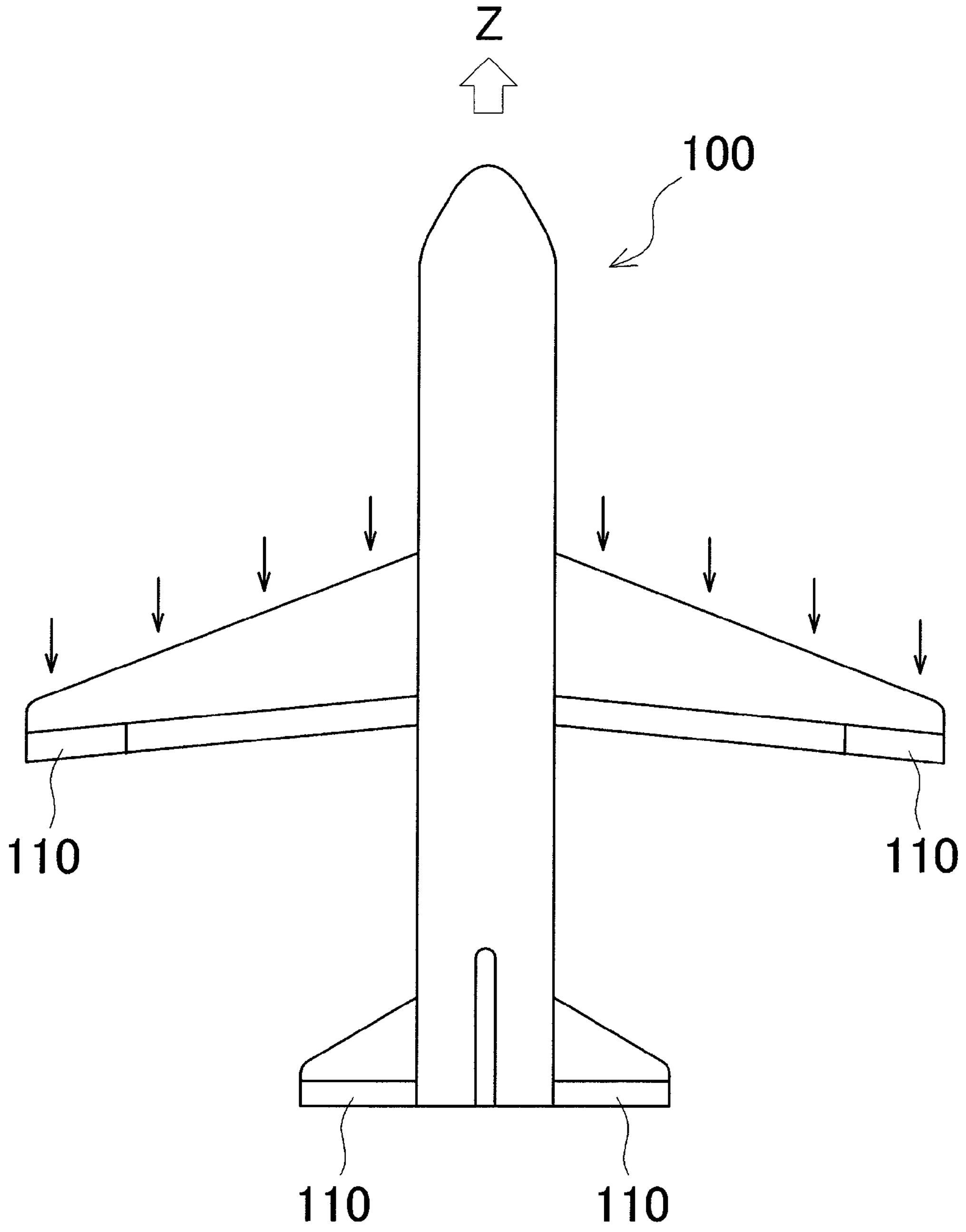
FIG. 2 illustrates an airplane having the electric actuator of FIG. 1.

FIG. 2 shows the airplane 100 flying in Z-direction. The rudder face 110 is stressed in Y1 or Y2 direction shown in FIG. 1, due to an air resistance. When the rudder face 110 is stressed in Y1 direction due to the air resistance, the rod 23 (see FIG. 1) is stressed in X1 direction shown in FIG. 1. On the other hand, when the rudder face 110 is stressed in Y2 direction due to the air resistance, the rod 23 (see FIG. 1) is stressed in X2 direction shown in FIG. 1.

Next, the following describes functions of the EHA 1 of Embodiment 1. To generate an axial force in X2 direction of FIG. 1 (that is to generate an axial force that opposes the air resistance causing a stress in Y1 direction of FIG. 1) on the rod 23 of the hydraulic cylinder 20, the variable-volume pump 12 is driven by the servo motor 11 so as to eject oil to the oil passage 42*a*. Then, the switch valve 50 is switched to the first switch position 50A. Thus, oil is supplied to the oil receiving chamber 20*b* through the oil passages 42*a* and 42*b*, and an axial force in X2 direction is generated on the rod 23. At this time, the oil in the oil receiving chamber 20*a* is supplied to the variable-volume pump 12 through the oil passage 41*b* and oil passage 41*a*.

Further, driving the variable-volume pump 12 to eject oil to the oil passage 41*a* generates an axial force in X1 direction of FIG. 1 on the rod 23 of the hydraulic cylinder 20.

In the EHA 1 of Embodiment 1, a pressure of oil ejected from the variable-volume pump 12 (the pressure is hereinafter referred to as ejection pressure) acts on the piston 72 through the oil passage 18 (oil passages 18*a*, oil passage 18*b*, and oil passage 18*c*). When the ejection pressure surpasses a predetermined pressure P1, the piston 72 moves against the bias force of the spring 74 and moves in a direction (advancing direction) of narrowing the second oil receiving chamber 17*b*. Then, with an increase in the ejection pressure, the amount of movement of the piston 72 in the advancing direction also increases. Note that the predetermined pressure P1 is determined based on the bias force of the spring 74.

Figure 3:
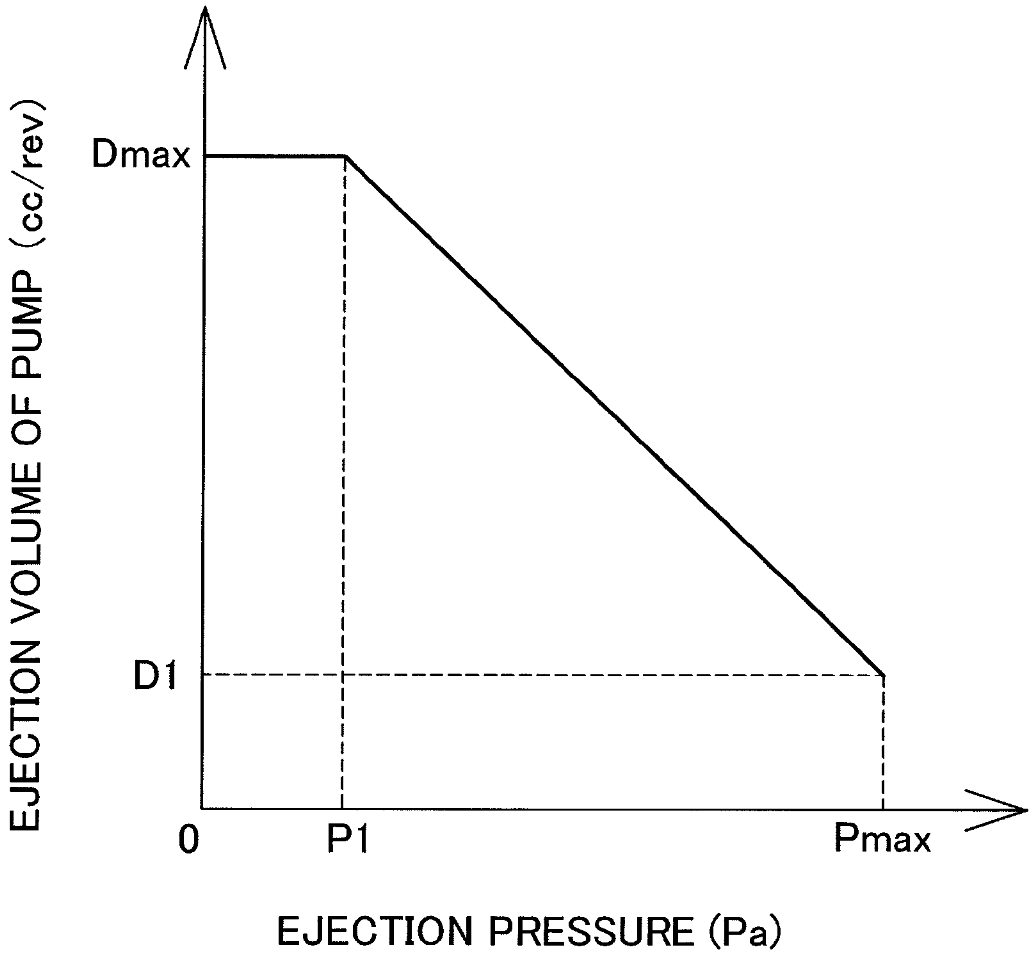
FIG. 3 shows a relation between ejection pressure and ejection volume of a variable-volume pump illustrated in FIG. 1.

That is, as in FIG. 3 showing a relation between the ejection pressure and ejection volume of the variable-volume pump 12, the ejection volume is constant and is Dmax until the ejection pressure reaches the predetermined pressure P1. Then, once the ejection pressure surpasses the predetermined pressure P1, the ejection volume of the variable-volume pump 12 decreases proportionally to the increase in the ejection pressure.

Further, the EHA 1 is structured so that the relief valve 32 opens when the ejection pressure surpasses a predetermined pressure Pmax. Therefore, the ejection pressure never surpasses the predetermined pressure Pmax. Note that, in FIG. 3, the ejection volume D1 is approximately 20% of Dmax, when the ejection pressure is Pmax. Sufficient effect however is achieved by setting D1 within a range of 5% to 70% of Dmax, according to the performance of EHA 1 required.

Further, when the ejection pressure decreases from the state where the ejection pressure is greater than the predetermined pressure P1, the piston 72 moves in the withdrawing direction and the oil in the first oil receiving chamber 17*a* moves to the second oil receiving chamber 17*b* through the throttle passage 72*a* formed on the piston 72.

Figure 4:
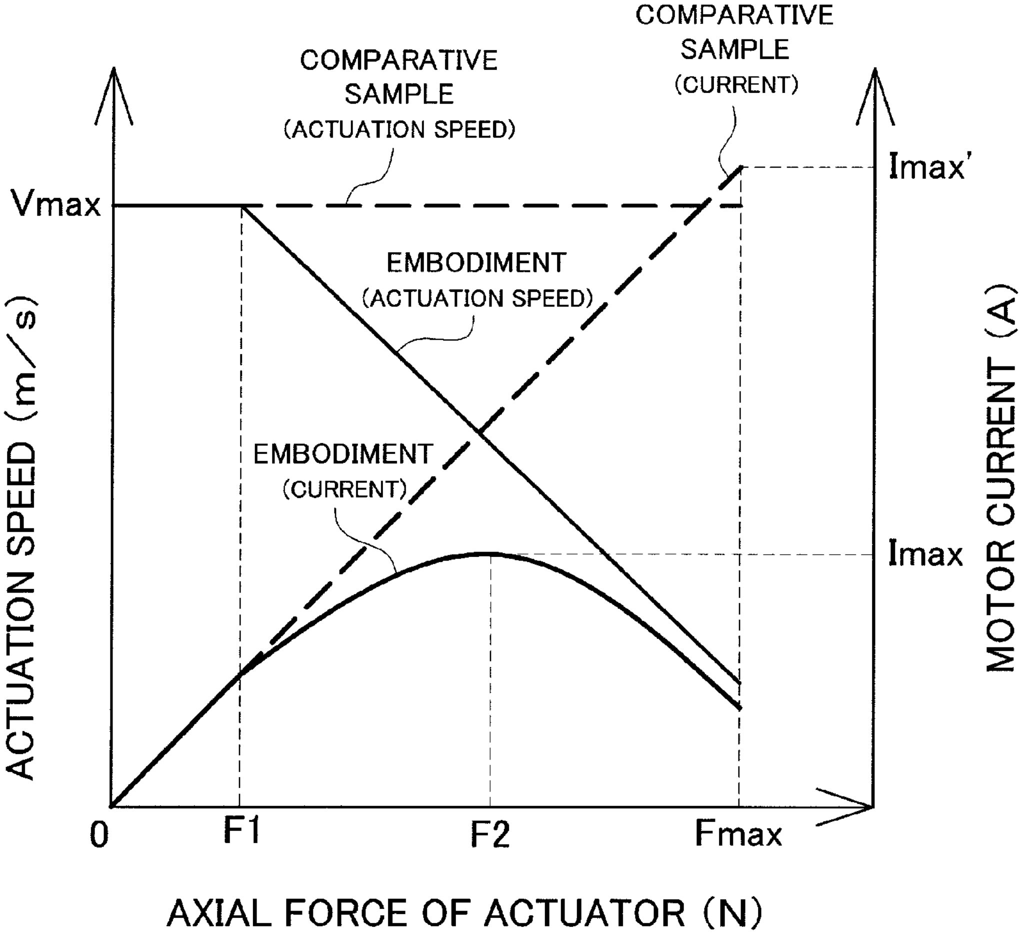
FIG. 4 is a schematic diagram showing a relation between axial force of an actuator and actuation speed, and a relation between axial force and motor current, in the electric actuator illustrated in FIG. 1.

FIG. 4 schematically shows a relation between an axial force of the actuator (force in an axial direction transmitted by the rod 23) and the actuation speed of the actuator (speed of the rod 23 moving inside the hydraulic cylinder 20), and a relation between the axial force of the actuator and a motor current (current flowing in the servo motor 11), in the EHA 1 of Embodiment 1. As a comparative sample, the figure also presents the above relations in cases where the ejection volume of the variable-volume pump 12 is kept constant.

Suppose the rotation speed of the servo motor 11 is controlled so that the servo motor 11 rotates at a predetermined rotation speed (e.g., maximum rotation speed), as shown in FIG. 4. When the axial force of the actuator surpasses F1, the actuation speed of the actuator proportionally decreases. In other words, the greater the air resistance acting on the rudder face 110, the slower the actuation speed of the actuator becomes. Note that the axial force F1 is an axial force of the actuator when the ejection pressure of the variable-volume pump 12 equals the predetermined pressure P1.

The motor current increases up to the maximum value Imax and then decreases, with the increase in the axial force of the actuator. The torque for driving the variable-volume pump 12 is proportional to the product of the axial force of the actuator (i.e., ejection pressure) and the ejection volume. That is, for example, when the ejection volume is constant, the torque increases with an increase in the axial force of the actuator. Further, when the axial force of the actuator is constant, torque required increases with an increase in the ejection volume.

The EHA 1 of Embodiment 1 is structured so that the ejection volume decreases with an increase in the axial force of the actuator (i.e., an increase in the ejection pressure). Therefore, while an increase in the axial force of the actuator increases the torque, that in crease in the torque is at least partially canceled by a decrease in the torque attributed to a decrease in the ejection volume. Thus, the rate of increase in the motor current until the axial force of the actuator reaches a predetermined axial force F2 is reduced.

When the axial force of the actuator surpasses the predetermined axial force F2, an amount of decrease in the torque attributed to the decrease in the ejection volume is greater than an amount of increase in the torque attributed to the increase in the axial force of the actuator. Accordingly, the torque required for driving the variable-volume pump 12 is reduced with an increase in the axial force of the actuator, and the motor current is also reduced with the variation in the torque.

On the other hand in the comparative sample in which the ejection volume is kept constant, the actuation speed of the actuator is constant even if the axial force of the actuator is increased. Meanwhile, the motor current proportionally increases, with the increase in the axial force of the actuator. This is because the torque to be output by the servo motor 11 increases proportionally to the axial force of the actuator, and the motor current increases proportionally to the torque.

The present embodiment deals with an exemplary structure in which, when the actuator outputs a predetermined maximum axial force Fmax (i.e., when the ejection pressure is Pmax), an ejection volume D1 of the variable-volume pump 12 is approximately 20% of a first ejection volume Dmax which is an ejection volume when the axial force of the actuator is zero. In this case, the value of the maximum motor current Imax is reduced to at least a half of the value of the maximum motor current Imax' in the comparative sample in which the ejection volume is constant. The difference would have been larger when comparing the exemplary structure with the comparative sample while the actuators of the both are outputting the predetermined maximum axial force Fmax. The setting of D1 is modifiable according to the performance of the actuator required. For example, setting D1 to 5% to 70% of Dmax will yield the above effect, and smaller D1 in relation to Dmax within this range is more effective.

As described above, a hydraulic pressure supply device 10 of the present embodiment according to the present invention includes: a servo motor 11; a variable-volume pump 12 which is driven by the servo motor 11 and ejects oil; a motor control device 13 which controls the servo motor 11 so as to achieve a set rotation speed; and a pump control device 14 which controls the variable-volume pump 12 so that the ejection volume of the variable-volume pump 12 decreases with an increase in the ejection pressure of the variable-volume pump 12.

This structure enables increasing of the ejection pressure of the variable-volume pump 12, without a need of supplying an excessive current to the servo motor 11. The structure further enables increasing of the flow amount of oil ejected from the variable-volume pump 12, without a need of excessively accelerating the rotation speed of the servo motor 11.

Further, when the ejection pressure is between a predetermined pressure P1, inclusive, and a predetermined pressure Pmax, inclusive, the pump control device 14 in the hydraulic pressure supply device 10 controls the variable-volume pump 12 so that the ejection volume of the variable-volume pump 12 decreases proportionally to an increase in the ejection pressure of the variable-volume pump 12.

The structure achieves a simple relation between the ejection pressure and the ejection volume of the variable-volume pump 12, and therefore control of the variable-volume pump 12 is made simple.

Further, in the hydraulic pressure supply device 10, the pump control device 14 includes: a rod 73 and a piston 72 which are moved by a pressure of oil ejected from the variable-volume pump 12 and which increase/decrease the ejection volume of the variable-volume pump 12; and a spring 74 which biases the piston 72 in a direction against the pressure of oil acting on the piston 72.

With the structure, there is provided a simply structured pump control device 14 capable of controlling the variable-volume pump 12 so that the ejection volume of the variable-volume pump 12 decreases proportionally to an increase in the ejection pressure of the variable-volume pump 12.

Further, the EHA 1 of Embodiment 1 includes the hydraulic pressure supply device 10 and a hydraulic cylinder 20 actuated in response to input of hydraulic fluid from the variable-volume pump 12.

In the structure, the hydraulic pressure supply device 10 is able to supply a high pressure oil to the hydraulic cylinder 20 with a low current. Therefore, a large axial force is output with a low current. Further, the structure enables increasing of the flow amount of hydraulic fluid ejected from the variable-volume pump 12, without a need of excessively accelerating the rotation speed of the servo motor 11. Thus, a large amount of hydraulic fluid can be supplied to the hydraulic cylinder 20 to drive the rod 23 at a high speed, with a low current. Thus, the current supply to the servo motor 11 is reduced, and heat generation of the servo motor 11 is restrained. Therefore, downsizing and weight reduction of the entire EHA 1 are possible. Further, reduced load on the motor control device 13 improves the reliability.

Further, the EHA 1 is for use in driving a flight control rudder face 110 provided to a wing of an airplane (main wing, vertical fin, horizontal stabilizer, or the like).

A rudder face 110 provided to a wing of an airplane is always highly stressed due to air resistance, during a flight of the airplane In view of that, the hydraulic cylinder 20 for driving the rudder face 110 needs to output a large force against the stress attributed to the air resistance, in the stalled condition. On the other hand, the position of the rudder face 110 is preferably adjusted at a higher actuation speed, during the standby condition before take off or the like in which the rudder face is subject to a low stress. In this regard, the EHA 1 by which a high pressure hydraulic fluid can be supplied to the hydraulic cylinder 20 with a low current is able to reduce power consumption in a stalled condition, and prevent heat generation in the servo motor 11. Further, the speed of driving the rudder face 110 can be accelerated when the rudder face 110 is subject to a low stress.

As described, the airplane needs to be capable of actuating the rudder face 110 at a high speed while the stress on the rudder face 110 is small, and even when the rudder face 110 is highly stressed, the airplane needs to be capable of actuating the rudder face 110 against the stress. Further, the relation between the stress acting the rudder face 110 and the required actuation speed of the rudder face 110 is such that the actuation speed drops substantially proportionally to an increase in the stress.

In this regard, in the EHA 1 of Embodiment 1 for driving the rudder face 110, the pump control device 14 controls the variable-volume pump 12 so that, when the ejection pressure is between the predetermined pressure P1, inclusive, and the predetermined pressure Pmax, inclusive, the ejection volume of the variable-volume pump 12 proportionally decreases with an increase in the ejection pressure of the variable-volume pump 12 so as to satisfy the above mentioned relation between the stress on the rudder face 110 and the required actuation speed of the rudder face 110. Thus, the EHA 1 is particularly suitable for controlling the rudder face 110.

Figure 5:
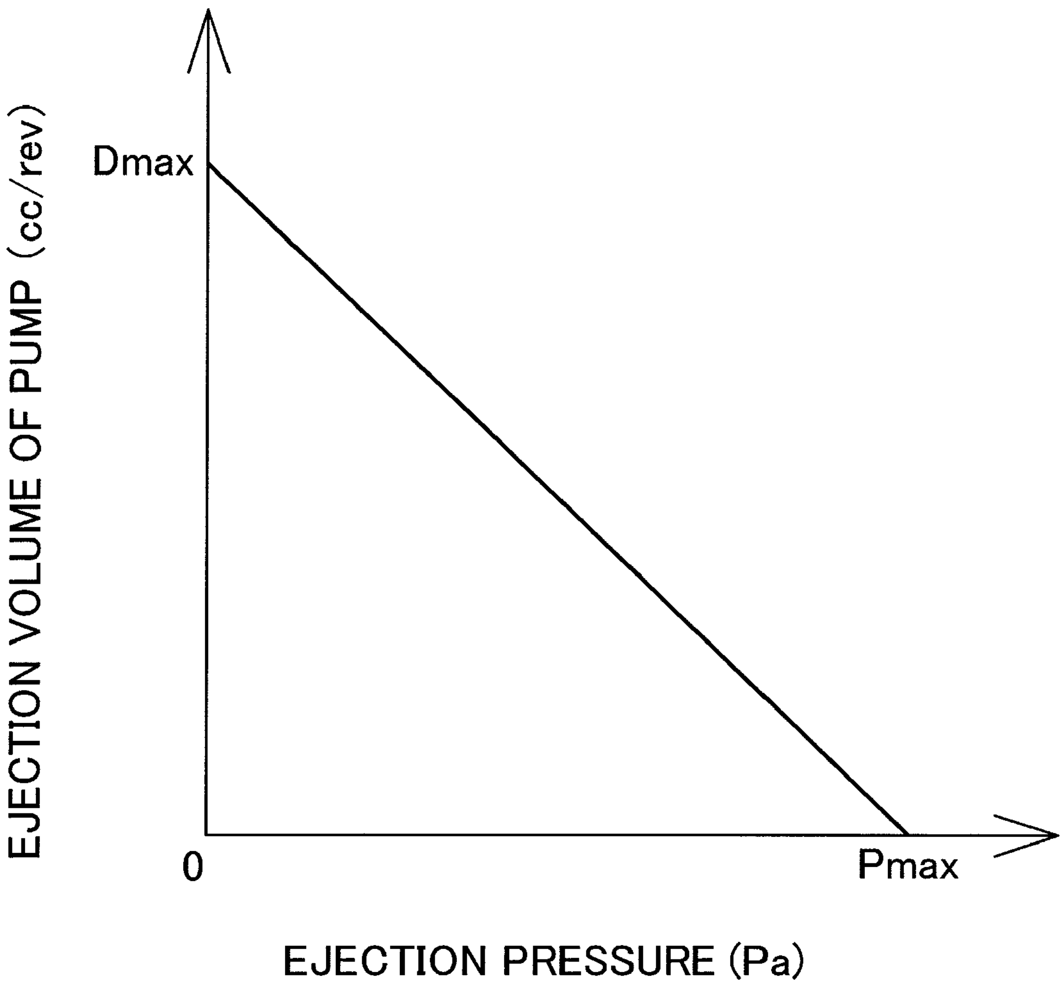
FIG. 5 showing a relation between ejection pressure and ejection volume in an alternative form of the variable-volume pump.

Note that, in the hydraulic pressure supply device 10, the variable-volume pump 12 is controlled so that the ejection volume is constant until the ejection pressure reaches the predetermined pressure P1. The present invention however is not limited to this. For example, as illustrated in FIG. 5, a structure in which the ejection volume decreases upon occurrence of an ejection pressure is possible. Further, as illustrated in FIG. 5, it is possible to adopt a structure in which the ejection volume is zero when the ejection pressure is the predetermined pressure Pmax at which the relief valve 32 opens.

Embodiment 2

Figure 6:
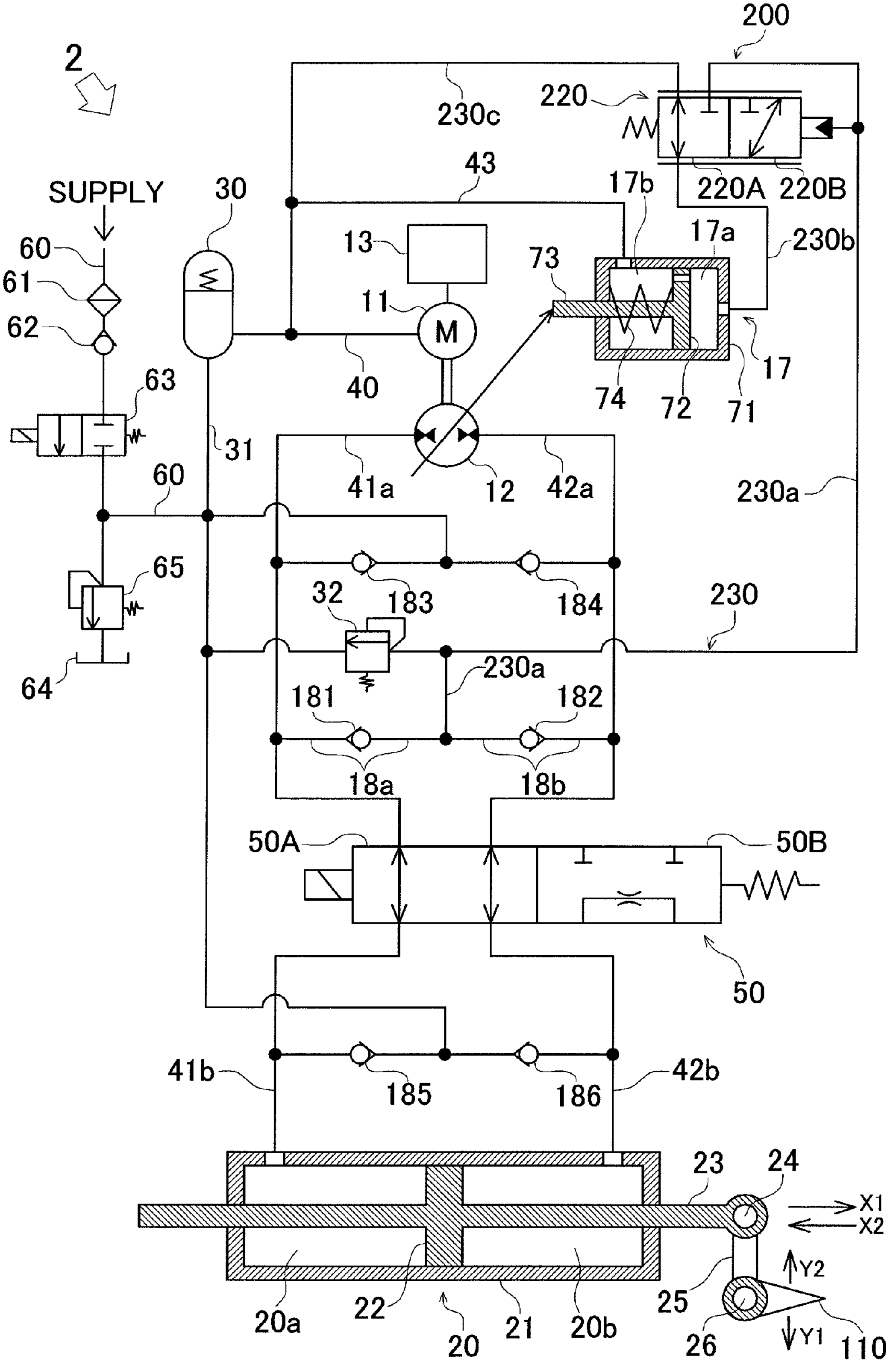
FIG. 6 illustrates a hydraulic circuit of an electric actuator of Embodiment 2, according to the present invention.

Next, the following describes an EHA 2 of Embodiment 2 according to the present invention. FIG. 6 illustrates the EHA 2 of Embodiment 2 according to the present invention. The EHA 2 (electric actuator) of Embodiment 2 is the same as the foregoing EHA 1 of Embodiment 1 except in the structure of the pump control device in the hydraulic pressure supply device. The members identical to those described in Embodiment 1 are given the same reference numerals and no further explanation for these members is provided hereinbelow.

A pump control device 200 of the EHA 2 includes: a spool valve 220 (pressure adjustment unit) between a variable-volume pump 12 and a tilt angle adjusting cylinder 17. That is, the pump control device 200 of Embodiment 2 includes: a tilt angle adjusting cylinder 17; an oil passage 230 which communicates oil passages 41*a* and 42*a* with the tilt angle adjusting cylinder 17; check valves 181 and 182 provided to the oil passage 230; and a spool valve 220. The oil passage 230 includes: an oil passage 18*a* branching off from the oil passage 41*a*; an oil passage 18*b* branching off from the oil passage 42*a*; an oil passage 230*a* to which the oil passages 18*a* and 18*b* are connected, and which communicates the oil passages 18*a* and 18*b* with the spool valve 220; an oil passage 230*b* communicating the spool valve 220 with the tilt angle adjusting cylinder 17; and an oil passage 230*c* communicating the spool valve 220 with an oil passage 43. Note that the oil passage 230*a* is in communication with a pilot chamber for switching the spool valve 220 to the second switch position 220B. Further, the spool valve 220 is biased by the spring in a direction of switching the spool valve 220 to a first switch position 220A.

When the hydraulic pressure of the oil passage 230*a* is lower than a predetermined pressure P2, the spool valve 220 is switched to the first switch position 220A so that the oil passage 230*b* is in communication with the oil passage 230*c* connected to the oil passage 43, while the connection to the oil passage 230*a* is blocked. When the hydraulic pressure of the oil passage 230*a* equals or surpasses the predetermined pressure P2, the spool valve 220 is switched to the second switch position 220B so that the oil passage 230*a* is in communication with the oil passage 230*b* communicating with the first oil receiving chamber 17*a* of the tilt angle adjusting cylinder 17, while the connection to the oil passage 230*c* is blocked. The spool valve 220 is structured so that the oil passages 230*a*, 230*b*, and 230*c* are temporarily connected with one another when switching the spool position.

With this structure, the ejection pressure of the variable-volume pump 12 acts on the spool valve 220 through the oil passage 230*a*. When the pressure (ejection pressure) of the oil passage 230*a* is lower than the predetermined pressure P2, the spool valve 220 is maintained in the first switch position 220A. In this case, the piston 72 of the tilt angle adjusting cylinder 17 is held in a fixed position. On the other hand, when the ejection pressure is increased and the pressure of the oil passage 230*a* reaches the predetermined pressure P2, the spool valve 220 is switched to the second switch position 220B. At this time, the oil passages 230*a*, 230*b*, and 230*c* are temporarily connected with one another. Therefore, a rapid increase in the pressure acting on the piston 72 of the tilt angle adjusting cylinder 17 is prevented. The piston 72 of the tilt angle adjusting cylinder 17 then moves to and is held at the end of its movable range in the advancing direction.

When an ejection pressure at P2 or higher drops below P2, the spool valve 220 is switched from the second switch position 220B to the first switch position 220A. The piston 72 then moves to the withdrawing direction while discharging oil from the first oil receiving chamber 17*a* through the oil passage 230*b*. Thus, faster movement of the piston 72 in the withdrawing direction is possible.

As described above, with the provision of the spool valve 220 between the variable-volume pump 12 and the piston 72, the EHA 2 of Embodiment 2 is able to adjust pressure acting on the piston 72. In the present embodiment, the pressure from the variable-volume pump 12, which acts on the piston 72, is decreased. Therefore, a rapid increase in the pressure acting on the piston 72 is prevented. This restrains the ejection volume of the variable-volume pump 12 from being unstable. Further, adjusting the pressure with the spool valve 220 provides a higher level of freedom in designing the tilt angle adjusting cylinder 17.

Embodiment 3

Figure 7:
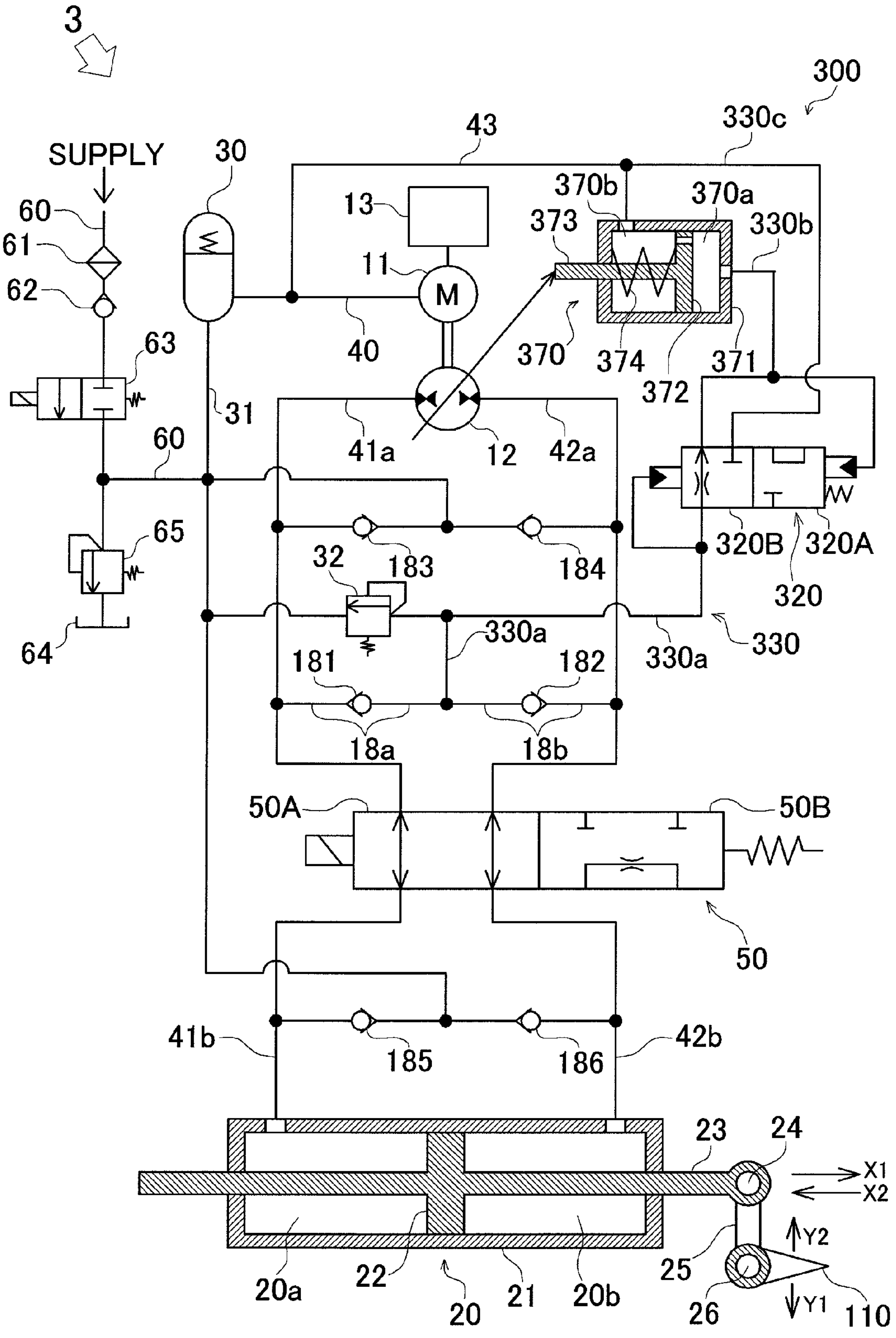
FIG. 7 illustrates a hydraulic circuit of an electric actuator of Embodiment 3, according to the present invention.
Figure 8:
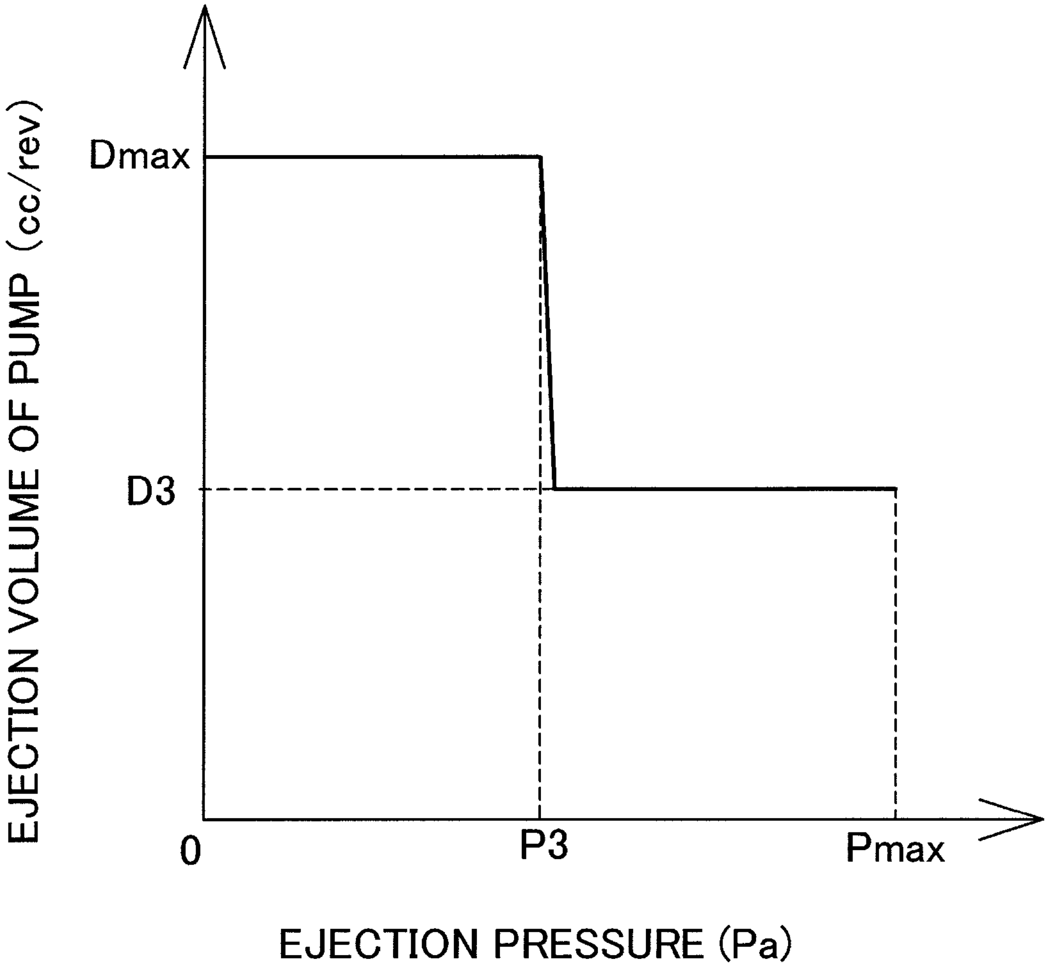
FIG. 8 shows a relation between ejection pressure and ejection volume of a variable-volume pump illustrated in FIG. 7.

The following describes an EHA 3 of Embodiment 3. FIG. 7 illustrates the EHA 3 of Embodiment 3 according to the present invention. FIG. 8 shows a relation between an ejection pressure and ejection volume of a variable-volume pump illustrated in FIG. 7. The EHA 3 (electric actuator) of Embodiment 3 is the same as the EHA 2 of Embodiment 2 except in the structure of the pump control device of the hydraulic pressure supply device. Members identical to those of Embodiment 2 are given the same reference numerals, and no further explanation for those members is provided hereinbelow.

A pump control device 300 of the EHA 3 is provided with a switch valve 320 between a variable-volume pump 12 and the tilt angle adjusting cylinder 370. More specifically, the pump control device 300 of Embodiment 3 includes: a tilt angle adjusting cylinder 370; an oil passage 330 communicating oil passages 41*a* and 42*a* with the tilt angle adjusting cylinder 370; a check valves 181 and 182 provided to the oil passage 330; and a switch valve 320. The oil passage 330 includes: an oil passage 18*a* branching off from the oil passage 41*a*; an oil passage 18*b* branching off from the oil passage 42*a*; an oil passage 330*a* to which the oil passages 18*a* and 18*b* are connected, and which communicates the oil passages 18*a* and 18*b* with the switch valve 320; an oil passage 330*b* communicating the switch valve 320 with the tilt angle adjusting cylinder 370; and an oil passage 330*c* communicating the switch valve 320 with an oil passage 43. Note that the oil passage 330*a* is in communication with a pilot chamber for switching the switch valve 320 to a second switch position 320B. Further, the oil passage 330*b* is in communication with another pilot chamber for switching the switch valve 320 to a first switch position 320A.

In the following description, a pressure difference ΔP is defined as to be a result of subtracting a hydraulic pressure of the oil passage 330, which is in communication with a first oil receiving chamber 370*a* of the tilt angle adjusting cylinder 370, from a hydraulic pressure of the oil passage 330*a*. When the pressure difference ΔP is smaller than a predetermined pressure difference ΔP3, the switch valve 320 is switched to the first switch position 320A so that the oil passage 330*b* is in communication with the oil passage 330*c* connected to the oil passage 43, while the connection to the oil passage 330*a* is blocked. When the pressure difference ΔP equals or surpasses the predetermined pressure difference ΔP3, the switch valve 320 is switched to the second switch position 320B so that the oil passage 330*a* is in communication with the oil passage 330*b* through a throttle, while the connection to the oil passage 330*c* is blocked. Note that the predetermined pressure difference ΔP3 is determined according to the bias force of the spring which biases the switch valve 320 to hold the same in the first switch position 320A.

Further, the tilt angle adjusting cylinder 370 includes: a cylinder body 371, a piston 372 (operation member) arranged in the cylinder body 371, a rod 373 (operation member) integrally engaged with the piston 372, and a spring 374 (elastic member) for biasing the piston 372. The cylinder body 371 and the piston 372 form a first oil receiving chamber 370*a* and a second oil receiving chamber 370*b*. To the first oil receiving chamber 370*a* is supplied oil through the oil passage 330*b*. The second oil receiving chamber 370*b* is capable of discharging oil to the oil passage 43.

The spring 374 in the tilt angle adjusting cylinder 370 biases the piston 372 with a force whereby, when no hydraulic pressure is occurring in the first oil receiving chamber 370*a*, the piston 372 is moved in the withdrawing direction. When the hydraulic pressure is transmitted to the first oil receiving chamber 370*a*, the piston 372 moves to and is held at the end of its movable range in the advancing direction. Note that, where a first ejection volume Dmax is an ejection volume of the variable-volume pump 12 before the piston 372 moves to the end of the movable range in the advancing direction, a second ejection volume D3 of the variable-volume pump 12 is approximately 50% of the first ejection volume, when the piston 372 is at the end of the movable range in the advancing direction. Note further that the second ejection volume D3 does not necessarily have to be approximately 50% of the first ejection volume Dmax, and may be modified to any ejection volume provided that at least a predetermined amount of oil is ejectable.

With this structure, the ejection pressure of the variable-volume pump 12 acts on the switch valve 320 through the oil passage 330*a*. When the variable-volume pump 12 is not driven, the ejection pressure does not act on the switch valve 320. Therefore, the switch valve 320 is held in the first switch position 320A. In this case, the piston 372 of the tilt angle adjusting cylinder 370 is held in a fixed position. Therefore, as illustrated in FIG. 8, the ejection volume of the variable-volume pump 12 is constant and is Dmax until the ejection pressure from the variable-volume pump 12 reaches a predetermined pressure P3. Note that the predetermined pressure P3 is a pressure such that the pressure difference ΔP equals the predetermined pressure difference ΔP3. On the other hand, when the ejection pressure increases up to the predetermined pressure P3, and the pressure difference ΔP reaches the predetermined pressure difference ΔP3, the switch valve 320 is switched to the second switch position 320B so that the oil passages 330*a* and 330*b* are in communication with each other through the throttle. In this case, the piston 372 of the tilt angle adjusting cylinder 370 moves to and is held at the end of its movable range in the advancing direction. Therefore, when the ejection pressure equals or surpasses P3, the ejection volume of the variable-volume pump 12 is D3 and is constant, as shown in FIG. 8.

When a pressure difference ΔP being equal to or greater than the predetermined pressure difference ΔP3 is reduced to a pressure difference ΔP smaller than the predetermined pressure difference ΔP3, the switch valve 320 is switched to the first switch position 320A. The piston 372 then moves in the withdrawing direction while discharging oil from the first oil receiving chamber 370*a* through the oil passage 330*b*. Thus, faster movement of piston 372 in the withdrawing direction is possible.

As described, the EHA 3 of Embodiment 3 includes: a servo motor 11; a variable-volume pump 12 which is driven by the servo motor 11 and ejects oil; a motor control device 13 which controls the servo motor 11 so as to achieve a set rotation speed; and a pump control device 300 which controls the variable-volume pump 12 so that the ejection volume of variable-volume pump 12 equals a first ejection volume Dmax while the ejection pressure of the variable-volume pump 12 is lower than a predetermined pressure P3, and the ejection volume of the variable-volume pump 12 equals a second ejection volume D3 when the ejection pressure of the variable-volume pump 12 reaches the predetermined pressure P3, the second ejection volume D3 being a half of the first ejection volume Dmax.

Controlling the variable-volume pump 12 so as to achieve the second ejection volume D3, as is done in the structure, enables increasing of the ejection pressure of the variable-volume pump 12, without a need of supplying an excessive current to the servo motor 11. Further, controlling the variable-volume pump 12 so as to achieve the first ejection volume Dmax enables increasing of the flow amount of oil ejected from the variable-volume pump 12, without a need of excessively accelerating the rotation speed of the servo motor 11.

Further, in the EHA 3, the pump control device 300 includes: a piston 372 and a rod 373 which are moved by a pressure of oil ejected from the variable-volume pump 12, an which increase/decrease the ejection volume of the variable-volume pump 12; a spring 374 which biases the piston 372 in a direction against the pressure of oil acting on the piston 372; and a switch valve 320 provided between the variable-volume pump 12 and the piston 372, which is switchable to a first switch position 320A so that communication between the variable-volume pump 12 and the piston 372 is blocked, and to a second switch position 320B so that the variable-volume pump 12 and the piston 372 are in communication. When the ejecting pressure of the variable-volume pump 12 is lower than the predetermined pressure P3, the switch valve 320 is retained in the first switch position 320A, and is switched to the second switch position 320B when the ejection pressure of the variable-volume pump 12 reaches the predetermined pressure P3.

This structure realizes a simple pump control device 200 which is capable of (i) when the ejection pressure of the variable-volume pump 12 is lower than the predetermined pressure P3, controlling the variable-volume pump 12 so that the ejection volume of the variable-volume pump 12 equals the first ejection volume Dmax; and (ii) when the ejection pressure of the variable-volume pump 12 reaches the predetermined pressure P3, controlling the variable-volume pump 12 so that the ejection volume of the variable-volume pump 12 equals the second ejection volume D3.

Embodiment 3 deals with a case where the oil passage 330*b* is in communication with the pilot chamber for switching the switch valve 320 to the first switch position 320A. The present invention however is not limited to this, and a structure without a pilot chamber is also possible. In this case, the switch valve 320 is switched based on: a pressure from the oil passage 330*a*, which acts on the pilot chamber, for switching the switch valve 320 to the second switch position 320B; and a bias force from a spring biasing the switch valve 320 in a direction of causing a switchover to the first switch position 320A.

Embodiment 4

Figure 9:
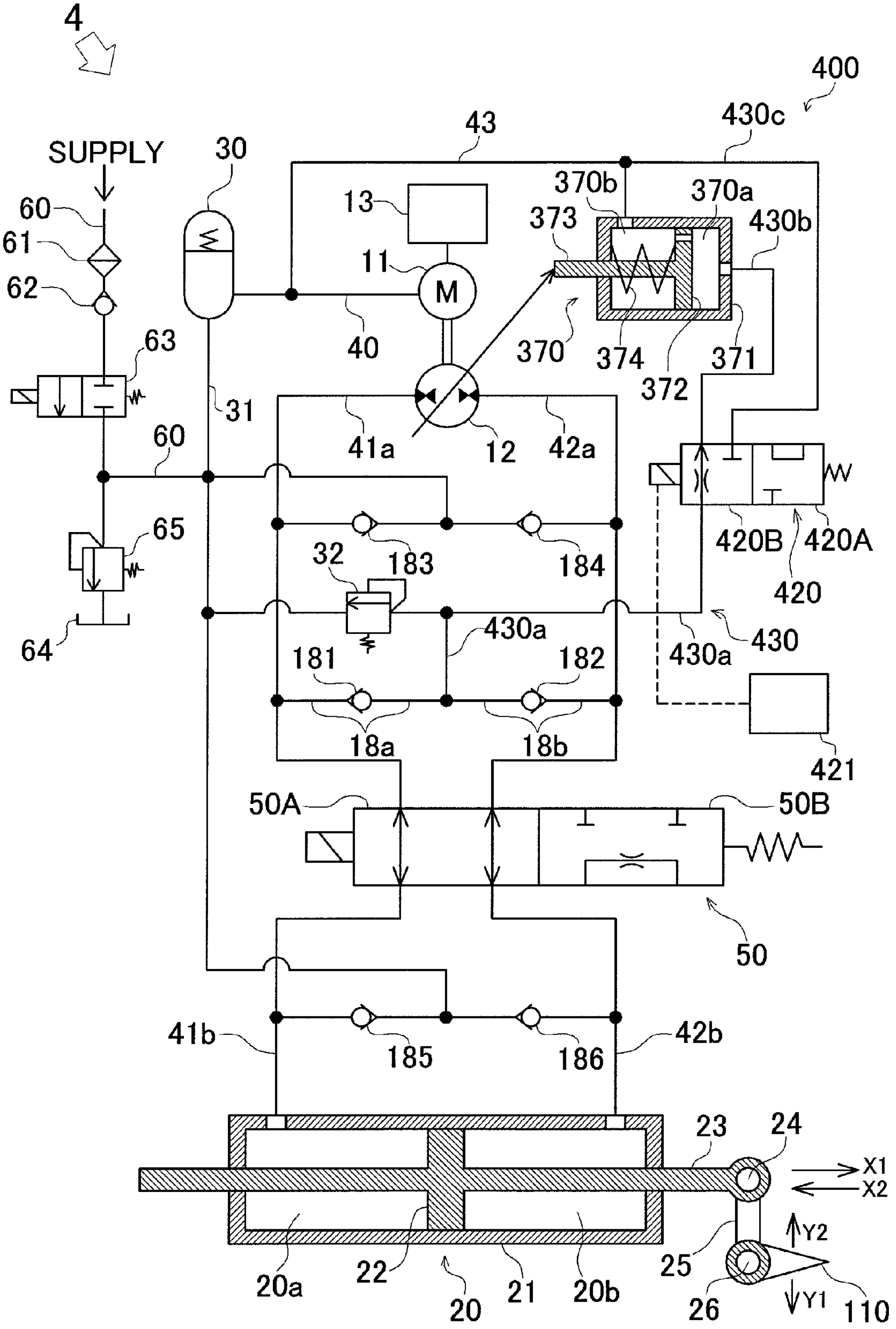
FIG. 9 illustrates a hydraulic circuit of an electric actuator of Embodiment 4, according to the present invention.
Figure 10:
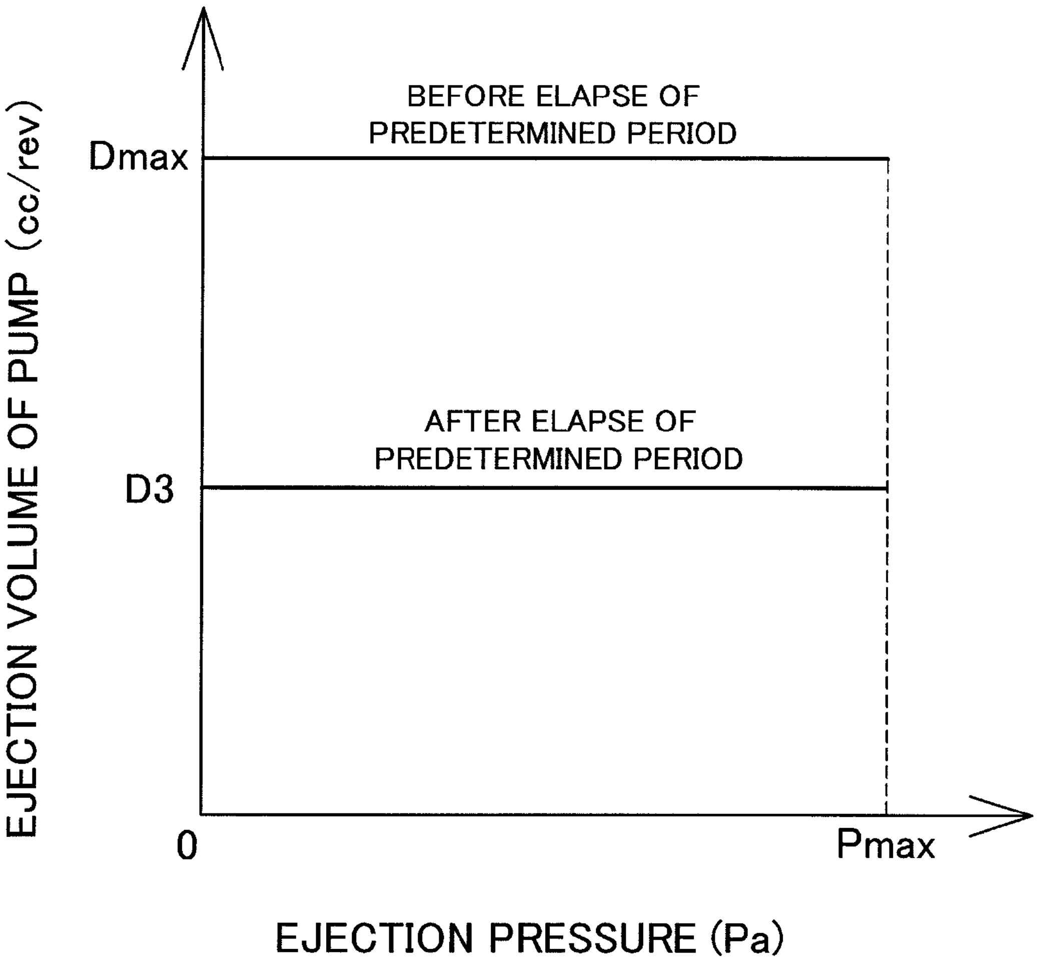
FIG. 10 shows a relation between ejection pressure and ejection volume of a variable-volume pump illustrated in FIG. 9.

Next, the following describes an EHA 4 of Embodiment 4. FIG. 9 illustrates the EHA 4 of Embodiment 4, according to the present invention. Further, FIG. 10 shows a relation between an ejection pressure and ejection volume of a variable-volume pump 12 shown in FIG. 9. The EHA 4 (electric actuator) of Embodiment 4 is the same as the foregoing EHA 3 of Embodiment 3 except in the structure of the pump control device in the hydraulic pressure supply device. Members identical to those described in Embodiment 3 are given the same reference numerals and no further explanation for those members is provided hereinbelow.

The pump control device 400 in the EHA 4 includes: an electromagnetic switch valve 420 provided between a variable-volume pump 12 and a tilt angle adjusting cylinder 370; and a valve switching device 421 capable of powering and switch the electromagnetic switch valve 420. The valve switching device 421 may be built inside the electric motor control device 13, as needed. More specifically, the pump control device 400 of Embodiment 4 includes: the tilt angle adjusting cylinder 370; an oil passage 430 communicating the oil passages 41*a* and 42*a* with the tilt angle adjusting cylinder 370; a check valve 181 and 182 provided to the oil passage 430; the electromagnetic switch valve 420 and the valve switching device 421. The oil passage 430 includes: an oil passage 18*a* branching off from the oil passage 41*a*; an oil passage 18*b* branching off from the oil passage 42*a*; an oil passage 430*a* to which the oil passages 18*a* and 18*b* are connected, and which communicates the oil passages 18*a* and 18*b* with the electromagnetic switch valve 420; an oil passage 430*b* communicating the electromagnetic switch valve 420 with the tilt angle adjusting cylinder 370; and an oil passage 430*c* communicating the electromagnetic switch valve 420 with an oil passage 43.

When the electromagnetic switch valve 420 is not powered, the electromagnetic switch valve 420 is switched to and held in a first switch position 420A so that the oil passages 430*b* and 430*c* are in communication while the connection to the oil passage 430*a* is blocked. When the electromagnetic switch valve 420 is powered by the valve switching device 421, the electromagnetic switch valve 420 is switched to a second switch position 420B so that the oil passages 430*a* and 430*b* are in communication with each other through a throttle while the connection to the oil passage 430*c* is blocked.

The valve switching device 421 is structured to power the electromagnetic switch valve 420 when a predetermined period elapses from a point when the rotation speed of a servo motor 11 is stabilized (hereinafter, rotation speed stabilizing point).

In other words, the electromagnetic switch valve 420 is held in the first switch position 420A until the predetermined period elapses from the rotation speed stabilizing point of a servo motor 11. In this case, the piston 372 of the tilt angle adjusting cylinder 370 is held in a fixed position. Therefore, until the elapse of the predetermined period from the rotation speed stabilizing point of a servo motor 11, the ejection volume of the variable-volume pump 12 is constant and is Dmax, as shown in FIG. 10. Upon elapse of the predetermined period from the rotation speed stabilizing point of a servo motor 11, the electromagnetic switch valve 420 is switched to the second switch position 420B. In this case, the piston 372 of the tilt angle adjusting cylinder 370 moves to and is held at the end of its movable range in the advancing direction. Therefore, as illustrated in FIG. 10, after the elapse of the predetermined period from the rotation speed stabilizing point of a servo motor 11, the ejection volume of the variable-volume pump 12 is constant and is D3.

If the rotation speed of the servo motor 11 is varied after the elapse of the predetermined period from the rotation speed stabilizing point of a servo motor 11, the electromagnetic switch valve 420 is switched to the first switch position 420A. The piston 372 then moves in the withdrawing direction while discharging the oil from the first oil receiving chamber 370*a* through the oil passage 430*b*. Thus, faster movement of the piston 372 in the withdrawing direction is possible.

As described, the EHA 4 of Embodiment 4 includes: a servo motor 11; a variable-volume pump 12 which is driven by the servo motor 11 and ejects oil; a motor control device 13 which controls the servo motor 11 so as to achieve a set rotation speed; a pump control device 400 which controls the variable-volume pump 12 so that the ejection volume of the variable-volume pump 12 equals a first ejection volume Dmax until a predetermined period elapses from a point when the rotation speed of the servo motor 11 is stabilized, and that the ejection volume of the variable-volume pump 12 is a second ejection volume D3 upon elapse of the predetermined time from the point when the rotation speed of the servo motor 11 stabilized.

After elapse of the predetermined period from a point when the rotation speed of the servo motor 11 is stabilized, the structure is able to increase the ejection pressure of the variable-volume pump 12, without a need of supplying an excessive current to the servo motor 11. Further, until the predetermined period elapses from that point when the rotation speed of the servo motor 11 is stabilized, the structure enables increasing of the flow amount of oil ejected from the variable-volume pump 12, without a need of excessively accelerating the rotation speed of the servo motor 11.

Further, in the EHA 4, the pump control device 400 includes: the piston 372 and a rod 373 which are moved by a pressure of oil ejected from the variable-volume pump 12 and which increases/decreases the ejection volume of the variable-volume pump 12; a spring 374 which biases the piston 372 in a direction against the pressure of oil acting on the piston 372; an electromagnetic switch valve 420 provided between the variable-volume pump 12 and the piston 372, which valve is switched to the first switch position 420A so as to block the connection to a passage communicating the variable-volume pump 12 with the piston 372, or to the second switch position 420B so as to communicate the variable-volume pump 12 with the piston 372. The electromagnetic switch valve 420 is held in the first switch position 420A by the valve switching device 421 until elapse of the predetermined period from the point when the rotation speed of the servo motor 11 is stabilized, and switched to the second switch position 420B upon elapse of the predetermined period from the point when the rotation speed of the servo motor 11 is stabilized.

This structure realizes a simply structured pump control device 400 which controls the variable-volume pump 12 so that the ejection volume of the variable-volume pump 12 equals the first ejection volume Dmax until the predetermined period elapses from a point when the rotation speed of the servo motor 11 is stabilized, and that the ejection volume of the variable-volume pump 12 equals the second ejection volume D3 upon elapse of the predetermined period from the point when the rotation speed of the servo motor 11 is stabilized.

The present invention is not limited to the embodiments described hereinabove, and may be altered and implemented in various ways within the scope of claims set forth hereinbelow.

(1) The variable-volume pump is not limited to a swash plate type axial piston pump in which a cylinder block is rotated. For example, the variable-volume pump may be a rotation swash plate piston pump in which a swash plate is rotated. Alternatively, the variable-volume pump may be an angled piston pump in which a drive shaft is tilted to cause reciprocation of the piston. Further, other variable-volume pumps are also adoptable. Further, the swash plate pump may adopt a structure having bearing in the swash plate instead of adopting a shoe (slipper), thereby allowing rotation of the piston head contact surface.

(2) The ejection volume may be varied in more than two steps, instead of varying the same in two steps as is the case of Embodiment 3 and Embodiment 4.

(3) The pump control unit does not necessarily have to have a tilt angle adjusting cylinder 17 or the like which is actuated by a pressure of the oil ejected from the variable-volume pump. For example, the pump control unit may be structured so as to vary the ejection volume of the variable-volume pump, based on a measurement result from a hydraulic pressure measurement device for measuring the ejection pressure of the variable-volume pump.

(4) Provision of a dumper to the piston 72 of the tilt angle adjusting cylinder 17 restrains rapid movement of the piston 72, which is more advantageous in terms of safety.

(5) Various types of motors are adoptable as the adjustable-speed motor, including: a surface magnet type or magnet-embedded type brushless motor, a switched reluctance motor, a synchronous motor, a motor with a brush, or the like. Further, the electric motor control unit for controlling the adjustable-speed motor may be integrated with the adjustable-speed motor, or provided apart from the adjustable-speed motor.

(6) Applications of the electric actuator of the present invention is not limited to driving of the rudder face of a wing of an airplane. Further, applications of the hydraulic fluid supply device of the present invention is not limited to an actuator actuated in response to input of hydraulic fluid.

(7) Applications of the present invention is not limited to a structure using oil as hydraulic fluid. For example, the present invention is also applicable to a compressed air supply device which uses the air as its hydraulic fluid.

What is claimed is:

1. A hydraulic fluid supply device, comprising:

an adjustable-speed motor;

a variable-volume pump which is driven by the adjustable-speed motor and ejects hydraulic fluid;

an electric motor control unit which controls the adjustable-speed motor so as to achieve an intended rotation speed; and a pump control unit which controls the variable-volume pump so that an ejection volume of the variable-volume pump decreases with an increase in an ejection pressure of the variable-volume pump, wherein the pump control unit includes:

an operation member that is moved by a pressure of hydraulic fluid ejected from the variable-volume pump, and that increases/decreases the ejection volume of the variable-volume pump;

an elastic member that biases the operation member in a direction against the pressure of hydraulic fluid acting on the operation member; and a pressure control unit provided between the variable-volume pump and the operation member, wherein the pressure control unit is switched to a first switch position so as to block a connection to a passage communicating the variable-volume pump with the operation member, or a second switch position so as to communicate the variable-volume pump with the operation member, and wherein the pressure control unit is held in the first switch position when the ejection pressure of the variable-volume pump is lower than the predetermined pressure and switched to the second switch position when the ejection pressure of the variable-volume pump reaches the predetermined pressure.

2. The hydraulic fluid supply device, according to claim 1, wherein the pump control unit controls the variable-volume pump so that the ejection volume of the variable-volume pump decreases proportionally to an increase in the ejection pressure of the variable-volume pump.

3. An electric actuator, comprising:
a hydraulic fluid supply device as defined in claim 2; and
an actuator actuated in response to input of hydraulic fluid from the variable-volume pump.

4. An electric actuator, comprising:
a hydraulic fluid supply device as defined in claim 1; and
an actuator actuated in response to input of hydraulic fluid from the variable-volume pump.

5. The electric actuator according to claim 4, for driving a rudder face of a wing of an airplane.

6. A hydraulic fluid supply device, comprising:
an adjustable-speed motor;
a variable-volume pump which is driven by the adjustable-speed motor and ejects hydraulic fluid;
an electric motor control unit which controls the adjustable-speed motor so as to achieve an intended rotation speed; and
a pump control unit which controls the variable-volume pump so that the ejection volume of the variable-volume pump equals a first ejection volume while the ejection pressure of the variable-volume pump is lower than a predetermined pressure, and that the ejection volume of the variable-volume pump equals a second ejection volume when the ejection pressure of the variable-volume pump reaches the predetermined pressure, the second ejection volume being smaller than the first ejection volume, wherein
the pump control unit includes:
an operation member which is moved by a pressure of hydraulic fluid ejected from the variable-volume pump, and which increases/decreases the ejection volume of the variable-volume pump;
an elastic member which biases the operation member in a direction against the pressure of hydraulic fluid acting on the operation member; and
a switch valve provided between the variable-volume pump and the operation member, which valve is switched to a first switch position so as to block a connection to a passage communicating the variable-volume pump with the operation member, or a second switch position so as to communicate the variable-volume pump with the operation member,
the switch valve being held in the first switch position when the ejection pressure of the variable-volume pump is lower than the predetermined pressure and switched to the second switch position when the ejection pressure of the variable-volume pump reaches the predetermined pressure.

7. An electric actuator, comprising:
a hydraulic fluid supply device as defined in claim 6; and
an actuator actuated in response to input of hydraulic fluid from the variable-volume pump.

8. A hydraulic fluid supply device, comprising:
adjustable-speed motor;
a variable-volume pump which is driven by the adjustable-speed motor and ejects hydraulic fluid;
an electric motor control unit which controls the adjustable-speed motor so as to achieve an intended rotation speed; and
a pump control unit which controls the variable-volume pump so that the ejection volume of the variable-volume pump equals a first ejection volume until a predetermined period elapses from a point when the rotation speed of the adjustable-speed motor becomes substantially constant,
and that the ejection volume of the variable-volume pump equals a second ejection volume upon elapse of the predetermined period from the point when the rotation speed of the adjustable-speed motor becomes substantially constant, wherein
the pump control unit includes:
an operation member which is moved by a pressure of hydraulic fluid ejected from the variable-volume pump, and which increases/decreases the ejection volume of the variable-volume pump;
an elastic member which biases the operation member in a direction against the pressure of hydraulic fluid acting on the operation member; and
a switch valve provided between the variable-volume pump and the operation member, which valve is switched to a first switch position so as to block a connection to a passage communicating the variable-volume pump with the operation member, or a second switch position so as to communicate the variable-volume pump with the operation member, the switch valve being held in the first switch position until the predetermined period elapses from the point when the rotation speed of the adjustable-speed motor becomes substantially constant and switched to the second switch position upon elapse of the predetermined period from the point when the rotation speed of the adjustable-speed motor becomes substantially constant.

9. An electric actuator, comprising:
a hydraulic fluid supply device as defined in claim 8; and
an actuator actuated in response to input of hydraulic fluid from the variable-volume pump.

* * * * *